United States Patent
Ueno et al.

(10) Patent No.: US 8,620,542 B2
(45) Date of Patent: Dec. 31, 2013

(54) VEHICLE SHIFT CONTROL APPARATUS

(75) Inventors: Koki Ueno, Toyota (JP); Takahiko Tsutsumi, Toyota (JP); Hiroatsu Endo, Nagoya (JP)

(73) Assignee: Toyota Jidosha Kabushiki Kaisha, Tokyo-shi, Aichi (JP)

( * ) Notice: Subject to any disclaimer, the term of this patent is extended or adjusted under 35 U.S.C. 154(b) by 4 days.

(21) Appl. No.: 13/257,687

(22) PCT Filed: Mar. 12, 2010

(86) PCT No.: PCT/JP2010/054717
§ 371 (c)(1),
(2), (4) Date: Sep. 20, 2011

(87) PCT Pub. No.: WO2010/110177
PCT Pub. Date: Sep. 30, 2010

(65) Prior Publication Data
US 2012/0016559 A1 Jan. 19, 2012

(30) Foreign Application Priority Data
Mar. 23, 2009 (JP) .................................. 2009-070373

(51) Int. Cl.
*B60W 50/02* (2012.01)
(52) U.S. Cl.
USPC .......................................................... 701/55
(58) Field of Classification Search
USPC .......................................................... 701/55
See application file for complete search history.

(56) References Cited

U.S. PATENT DOCUMENTS

| | | | |
|---|---|---|---|
| 5,267,157 A | 11/1993 | Churchill et al. | |
| 5,591,102 A * | 1/1997 | White et al. | 477/107 |
| 6,205,390 B1 * | 3/2001 | Holbrook et al. | 701/62 |
| 6,508,139 B2 * | 1/2003 | Onodera | 74/335 |
| 6,510,371 B1 * | 1/2003 | Lee | 701/64 |
| 7,572,203 B2 * | 8/2009 | Kashiwagi et al. | 477/34 |
| 7,603,922 B2 * | 10/2009 | Kim | 74/335 |
| 7,845,248 B2 * | 12/2010 | Yoshiyama et al. | 74/335 |

(Continued)

FOREIGN PATENT DOCUMENTS

| | | |
|---|---|---|
| JP | 2005-7993 | 1/2005 |
| JP | 2009-281577 | 12/2009 |

OTHER PUBLICATIONS

International Search Report in International Application No. PCT/JP2010/054717; Mailing Date: Aug. 5, 2010.

(Continued)

*Primary Examiner* — Thomas Tarcza
*Assistant Examiner* — Alex C Dunn
(74) *Attorney, Agent, or Firm* — Finnegan, Henderson, Farabow, Garrett & Dunner, LLP

(57) ABSTRACT

It is provided a vehicle shift control apparatus that electrically controls switchover of a shift range of a transmission based on a position signal corresponding to an operational position in a shift operating device, the vehicle shift control apparatus being capable of storing therein a determination result of whether the position signal is normal or abnormal, the shift range being switched based on the position signal acquired when a vehicle electric power supply is turned on if a memory of the determination result is retained when the vehicle electric power supply is turned on, the shift range not being switched based on the position signal acquired when the vehicle electric power supply is turned on if the memory of the determination result is not retained.

20 Claims, 9 Drawing Sheets

(56) References Cited

U.S. PATENT DOCUMENTS

| | | | |
|---|---|---|---|
| 8,175,778 B2* | 5/2012 | Kitaori | 701/52 |
| 8,301,348 B2* | 10/2012 | Nagashima et al. | 701/58 |
| 2001/0003807 A1* | 6/2001 | Lee | 701/51 |
| 2001/0027147 A1 | 10/2001 | Shinso et al. | |
| 2002/0002430 A1* | 1/2002 | Nada | 701/35 |
| 2004/0162661 A1* | 8/2004 | Kikuchi | 701/62 |
| 2005/0126322 A1* | 6/2005 | Kozaki et al. | 74/335 |
| 2006/0276300 A1 | 12/2006 | Kashiwagi et al. | |
| 2008/0168853 A1* | 7/2008 | Amamiya et al. | 74/335 |

OTHER PUBLICATIONS

Written Opinion of the International Searching Authority in International Application No. PCT/JP2010/054717; Mailing Date: Aug. 5, 2010.

International Preliminary Report on Patentability in International Application No. PCT/JP2010/054717; Completion Date: Jul. 15, 2011.

* cited by examiner

SHIFT POSITION (LATERAL DIRECTION)

| SHIFT POSITION | N-POSITION | R-POSITION | D-POSITION | M-POSITION | B-POSITION |
|---|---|---|---|---|---|
| SHIFT-SENSOR DETECTION SIGNAL VOLTAGE $V_{SF}$ | mid | high | low | mid | low |
| SELECT-SENSOR DETECTION SIGNAL VOLTAGE $V_{SL}$ | high | high | high | low | low |

FIG.6

| ACTUAL SHIFT POSITION | N-POSITION | R-POSITION | D-POSITION | M-POSITION | B-POSITION |
|---|---|---|---|---|---|
| [1] NORMAL TIME(ORDINARY TIME) (WHEN [2] TO [5] BELOW ARE NOT SATISFIED) | N | R | D | M | B |
| [2] WHEN SHIFT SENSOR IS FAILED AND SELECT SENSOR IS NOT FAILED | N (IN THE CASE OF OPERATION FROM M- OR B-POSITION) | N | N | M | M |
| [3] WHEN SELECT SENSOR IS FAILED AND SELECT SENSOR FAIL-SAFE IS PROHIBITED | M | M | B | M | B |
| [4] WHEN SELECT SENSOR IS FAILED AND SELECT SENSOR FAIL-SAFE IS PERMITTED | M | N | N | M | N |
| [5] WHEN SHIFT SENSOR IS FAILED AND SELECT SENSOR IS FAILED | M | M | M | M | M |

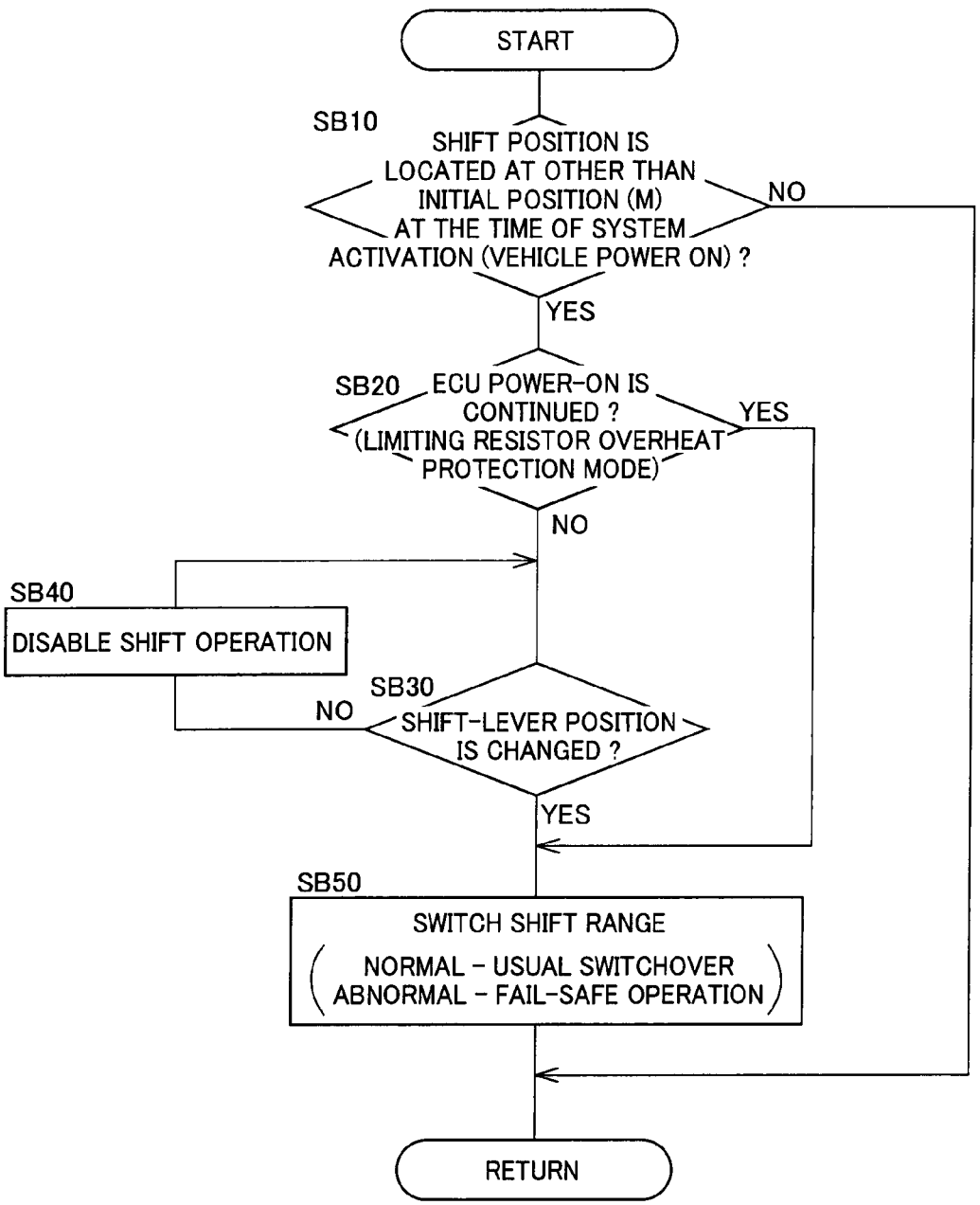

VEHICLE SHIFT CONTROL APPARATUS

CROSS-REFERENCE TO RELATED APPLICATIONS

This application is a national phase application of International Application No. PCT/JP2010/054717, filed Mar. 12, 2010, and claims the priority of Japanese Application No. 2009-070373, filed Mar. 23, 2009, the contents of both of which are incorporated herein by reference.

TECHNICAL FIELD

The present invention relates to a vehicle shift control apparatus that switches a shift range of a transmission depending on operational positions in a shift operating device, and, more particularly, to a shift-by-wire technology of electrically controlling the shift range switchover.

BACKGROUND ART

A vehicle shift control apparatus employing a so-called shift-by-wire (SBW) system is well known that detects an operational position in a shift operating device operated by a driver, for example, a lever position of a shift lever, with a sensor, etc., to electrically control switchover to a shift range of a transmission corresponding to the shift operation based on a position signal indicative of the detected lever position. Specifically, if the shift range determined based on the position signal from the sensor is within a traveling range, the vehicle shift control apparatus outputs a control signal an automatic transmission to perform the drive control of putting the automatic transmission into a vehicle traveling state corresponding to the traveling range, And if the determined shift rage is the parking range (P-range), the vehicle shift control apparatus outputs a control signal to a parking lock device that mechanically blocks the rotation of drive wheels to perform perking lock by actuating the parking lock device to mechanically block the rotation of the drive wheels. For example, Patent Document 1 describes a shift operation device of transmission employing the shift-by-wire system, which includes a so-called momentary-type shift lever having the state of the shift lever automatically returned after operation by a driver to an initial position that is the state before the operation.

Patent Document 1: Japanese Patent Application Laid-Open Publication No. 2005-007993

DISCLOSURE OF INVENTION

Problem to be Solved by the Invention

A shift operating device may have an abnormality in a momentary-type shift lever, for example, an abnormality causing so-called ON-fixation resulting in no change in a detection value of a sensor that detects a shift position. Since the signal output from the shift sensor exists in the case of such an abnormality causing the ON-fixation, it is difficult to determine whether the sensor output is due to the ON-fixation or driver's operation. For example, from the position signal generated when a vehicle electric power supply is turned on (vehicle power-on) while a shift lever is in the operated state at an operational position other than the initial position, it is difficult to determine whether the sensor output due to the ON-fixation or the sensor output due to driver's operation. In this regard, to prevent erroneous determination of shift operation due to the ON-fixation, it is conceivable that based on a position signal generated when the shift lever is operated, for example, a position signal generated when a change is made in signal output, a switchover is executed to the shift range corresponding to the operation. Therefore, in this case, when the vehicle electric power supply is turned to the vehicle power-on from the off-state (vehicle power-off) (OFF→ON) while the shift lever is in the operated state, the position signal based on the shift operation is not accepted (i.e., rejected) and the switchover to the shift range of the transmission corresponding to the shift operation is not executed. Since it is difficult to determined whether the sensor output at the time of the vehicle power-on is a normal output due to driver's operation or an output due to the ON-fixation, if the shift lever is in the operated state at an operational position other than the initial position at the time of the vehicle power-on, the switchover of the shift range of the transmission is not executed. However, this may not accommodate a request of a driver who wants to switch a shift range of the transmission immediately at the time of the vehicle power-on, for example, and the convenience may be reduced. From another viewpoint, for example, the fail-safe operation to be executed at the time of abnormality of sensor output is not executed immediately at the time of the vehicle power-on even if an abnormality actually occurs, and the switchover to an appropriate shift range may be delayed at the time of abnormality. The above problems are not known.

The present invention was conceived in view of the above background and it is therefore the object of the present invention to provide a vehicle shift control apparatus capable of improving user's convenience in the electric switchover control of the shift range of the transmission based on an operational position in a shift operating device.

Means for Solving Problem

The object indicated above may be achieved according to the present invention, which provides a vehicle shift control apparatus (a) that electrically controls switchover of a shift range of a transmission based on a position signal corresponding to an operational position in a shift operating device, (b) the vehicle shift control apparatus being capable of storing therein a determination result of whether the position signal is normal or abnormal, (c) the shift range being switched based on the position signal acquired when a vehicle electric power supply is turned on if a memory of the determination result is retained when the vehicle electric power supply is turned on, the shift range not being switched based on the position signal acquired when the vehicle electric power supply is turned on if the memory of the determination result is not retained.

Effect of the Invention

In this way, if the memory is retained for the determination result of whether the position signal of the operational position in the shift operating device is normal or abnormal, the switchover of the shift range of the transmission is executed based on the position signal when the vehicle electric power supply is turned on (vehicle power-on) and, therefore, the switchover is immediately executed to the shift range of the transmission corresponding to the operational position at the time of the vehicle power-on. For example, since the switchover is executed to the shift range of the transmission corresponding to the operational position already changed by the user's operation at the time of the vehicle power-on rather than subsequently to the detection of a change in the operational position after the vehicle power-on, the request may be accommodated for a user who wants to immediately switch the shift range of the transmission, that is, a response to the operation of the user is given immediately, and the user's convenience is improved. More specifically, if a determination result is retained indicating that the position signal is normal, the switchover to the shift range at the time of normal control (at the normal time) is executed correspondingly to the operational position already changed by the user's operation at the time of the vehicle power-on. From another viewpoint, if a determination result is retained to indicate that the position signal is abnormal, the fail-safe operation to be executed at the time of abnormality is immediately executed at the time of the vehicle power-on, and the switchover to an appropriate shift range suitable for the abnormal time is promptly executed. On the other hand, if the memory of the determination result is not retained, since the switchover of the shift range of the transmission is not executed based on the position signal when the vehicle is powered on, the shift range is avoided from being switched in accordance with a position signal not determined as to whether normal or abnormal. For example, at the time of the abnormality causing the ON-fixation in the shift operating device, the switchover to the same shift range as the normal control is avoided from being executed based on the abnormal position signal at that point.

In another aspect of the invention, if the memory of the determination result is not retained, the shift range is switched based on a changed position signal, provided that the position signal is changed after the vehicle electric power supply is turned on. This enables the shift range of the transmission to be properly switched in accordance with the position signal determined whether normal or abnormal, for example.

In another aspect of the invention, the memory of the determination result is retainable regardless of a state of the vehicle electric power supply. This increases the opportunity that enables the switchover of the shift range of the transmission to be executed based on the operational position in the shift operating device at the time of the vehicle power-on.

In another aspect of the invention, the vehicle shift control apparatus includes an electronic control portion that controls switchover of a shift range of the transmission related to traveling of a vehicle based on the position signal and that determines whether the position signal is normal or abnormal to store the determination result, wherein even while the vehicle electric power supply is turned off, if the electronic control portion is operated to improve durability of equipments making up the transmission, the shift range is switched based on the position signal acquired when the vehicle electric power supply is turned on. This causes the switchover to be properly executed to the shift range of the transmission corresponding to the operational position at the time of vehicle power-on since the memory of the determination result is retained as to whether the position signal is normal or abnormal because the electronic control portion is in operation.

In another aspect of the invention, the memory of the determination result is retained until a predetermined time has elapsed after the vehicle electric power supply was turned off. This enables the switchover of the shift range of the transmission to be executed based on the operational position in the shift operating device at the time of vehicle power-on if the vehicle is powered on before the predetermined time has elapsed after the vehicle electric power supply is put into the off-state (vehicle power-off).

In another aspect of the invention, the shift operating device includes a momentary-type operation element returned to an initial position while an external force is not applied, and if the operation element is located in an operational position other than the initial position when the vehicle electric power supply is turned on, the shift range is switched based on whether the memory of the determination result is retained. This causes the switchover to be properly executed to the shift range of the transmission corresponding to an operational position other than the initial position already changed since the user operates an operation element when the vehicle is turned on.

In another aspect of the invention, the transmission is made up of various planetary gear type multistage transmissions having, for example, four speeds forward, five speeds forward, six speeds forward, or more shift stages alternatively achieving a plurality of gear stages (transmission stages) by an engaging device selectively coupling rotational elements of a plurality of sets of planetary gearing devices; a synchronous engaging parallel two-shaft automatic transmission including a plurality of pairs of always engaged transmission gears between two shafts to alternatively achieve the power transmitting state with any one of the plurality of pairs of transmission gears by a synchronizing device, the synchronous engaging parallel two-shaft automatic transmission being capable of automatically switching the transmission stages with the synchronizing device driven by a hydraulic actuator; a so-called belt type continuously variable transmission having a transmission belt acting as a power transmission member wound around a pair of variable pulleys having variable effective diameters to steplessly and continuously change the transmission gear ratio; a so-called traction type continuously variable transmission having a pair of cones rotated around a common shaft center and a plurality of rollers that are rotatable around the rotation center intersecting with the shaft center and pinched between the pair of cones to vary the transmission gear ratio by changing the intersecting angle between the rotation center of the rollers and the shaft center; an automatic transmission including a differential mechanism made up of, for example, a planetary gearing device distributing the power from an engine to a first electric motor and an output shaft and a second electric motor disposed on the output shaft of the differential mechanism to electrically change the transmission gear ratio by mechanically transmitting the main portion of the power from the engine through differential action of the differential mechanism to drive wheels and electrically transmitting the remaining portion of the power from the engine by using an electric path from the first motor to the second motor; or an automatic transmission mounted on a so-called parallel hybrid vehicle including an electric motor in a manner enabling power transmission to an engine shaft and an output shaft.

In another aspect of the invention, engines, i.e., internal-combustion engines such as gasoline engines and diesel engines are widely used as drive power sources of vehicles. An electric motor may be added as an auxiliary power source for traveling to the engine. Alternatively, only an electric motor may be used as the drive power source for traveling.

BRIEF DESCRIPTION OF DRAWINGS

FIG. 6 is a chart for explaining a shift position recognized when an electronic control portion determines a sensor abnormality in the P-range of the shift range in the transmission of FIG. 1;

FIG. 12 is a flowchart for explaining the control operation for improving the user's convenience in the electric switching control of the shift range of the transmission based on the shift position in the main part of the control operation of the electronic control portion, i.e., the shift operating device, depicting another embodiment corresponding to FIG. 9.

BEST MODES FOR CARRYING OUT THE INVENTION

Embodiments of the present invention will now be described in detail with reference to the drawings.

First Embodiment

Figure 1:
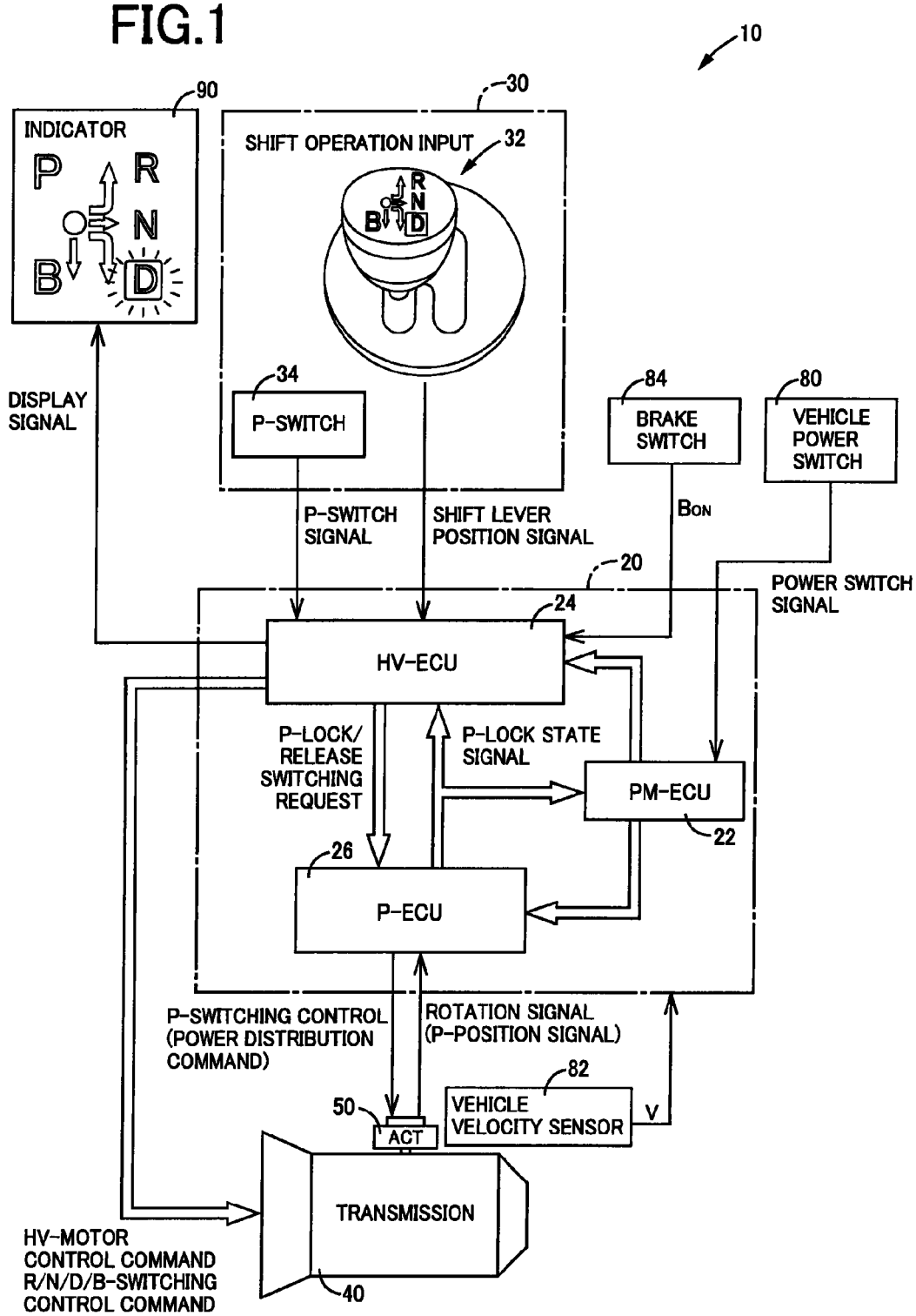
FIG. 1 is a schematic diagram for explaining a configuration of a vehicle shift control apparatus to which the present invention is applied.

FIG. 1 is a schematic diagram for explaining a configuration of a vehicle shift control apparatus (hereinafter, "shift control apparatus") 10 to which the present invention is applied. This shift control apparatus 10 includes an electronic control portion 20, a shift operating device 30, a transmission 40, a parking lock device 50, etc., and functions as a shift-by-wire type shift control apparatus. Although the following description will be made of an example that the shift control apparatus 10 of the present invention is applied to the transmission 40 preferably used with a hybrid vehicle including an engine and an electric motor as drive power sources, the shift control apparatus 10 of the present invention may be applied to any types of vehicles such as normal engine vehicles, hybrid vehicles, and electric vehicles.

The electronic control portion 20 includes a so-called microcomputer made up of CPU, ROM, RAM, and input/output interfaces and executes signal processes in accordance with programs stored in ROM in advance while utilizing a temporary memory function of the RAM to perform the drive control such as hybrid drive control for an engine not depicted and an electric motor included in the transmission 40 and the switchover control of a shift range of the transmission 40 by using the shift-by-wire system.

The electronic control portion 20 is supplied with, for example, position signals corresponding to a shift position $P_{SH}$ from a shift sensor 36 and a select sensor 38 (see FIG. 2) that are position sensors for detecting an operational position (shift position) $P_{SH}$ of a shift lever 32; a P-switch signal indicative of a switch operation in a P-switch 34 operated by a user for switching the shift range of the transmission 40 between a parking range (P-range) and non-P-range other than the perking range; a P-position signal indicative of an operation state of the parking lock in the parking lock device 50 for switching the shift range of the transmission 40 between the P-range and the non-P-range by actuating or releasing the parking lock; a power switch signal indicative of a switch operation in a vehicle power switch 80 operated by a user for switching a vehicle electric power supply between the on-state (vehicle power-on) and the off-state (vehicle power off); a vehicle speed signal indicative of a vehicle velocity V corresponding to an output rotation velocity of the transmission 40 from a vehicle velocity sensor 82; and a brake operation signal indicative of a foot brake operation $B_{ON}$ from a brake switch 84.

The electronic control portion 20 outputs, for example, an engine output control command signal that controls the engine output; a hybrid motor control command signal that commands the operation of the electric motor in the transmission 40; a shift range switching control command signal for switching the shift range of the transmission 40; a shift range display signal for displaying the switching state of the shift range and a parking lock display signal for displaying the parking lock state by operating an indicator (displaying device) 90; and a P-switching control command signal that command the operation of the parking lock device 50.

Specifically, the electronic control portion 20 includes an electric power supply control computer (hereinafter, "PM-ECU") 22, a hybrid control computer (hereinafter, "HV-ECU") 24, and a parking control computer (hereinafter, "P-ECU") 26.

The PM-ECU 22 switches the vehicle power-on and the vehicle power-off based on the power switch signal from the vehicle power switch 80 operated by a user, for example. For example, when detecting the input of the power switch signal during the vehicle power-off, the PM-ECU 22 puts a relay not depicted for switching the vehicle power-on and the vehicle power-off into the on-state to power on the vehicle. When detecting that the vehicle velocity V is less than a predetermined vehicle velocity V' and detecting the input of the power switch signal during the vehicle power-on, the PM-ECU 22 puts the relay into the off-state to power off the vehicle. When powering off the vehicle, if a P-lock state signal input from the P-ECU 26 is a signal indicative of the parking lock being canceled in the parking lock device 50, the PM-ECU 22 actuates the parking lock in the parking lock device 50 to output a signal for setting the shift range to the P-range (this actuation is called "auto-P actuation").

The HV-ECU 24 generally controls the operation of the transmission 40, for example. For example, when the PM-ECU 22 switches the vehicle power-off to the vehicle power-on, if the HV-ECU 24 detects the input of the brake operation signal indicative of the foot brake operation $B_{ON}$, the HV-ECU 24 activates a hybrid system for enabling the traveling of the vehicle and outputs the hybrid motor control command signal related to the traveling of the vehicle to the transmission 40 to control the traveling of the vehicle. The HV-ECU 24 outputs the shift range switching control command signal to the transmission 40 to switch the shift range based on the position signals corresponding to the shift position $P_{SH}$ from the shift sensor 36 and the select sensor 38. The HV-ECU 24 outputs to the P-ECU 26 the P-switchover signal for switching the shift range of the transmission 40 between the P-range and the non-P-range based on the P-switch signal from the P-switch 34. The HV-ECU 24 outputs to the indicator 90 the display signal for displaying the state of the shift range. The indicator 90 displays the state of the shift range based on the display signal output by the HV-ECU 24. In this embodiment, although of course the vehicle power-on is intended to cause the hybrid system to be activated to enable the traveling of the vehicle as above, the vehicle power-on may enable at least the switching control of the shift range of the transmission 40 even if the traveling of the vehicle is not enabled (control is unable to perform for the hybrid motor such as an electric motor).

The P-ECU 26 controls the drive of the parking lock device 50 and actuates or releases the parking lock to switch the shift range between the P-range and the non-P-range based on the P-switchover signal from the HV-ECU 24, for example. The P-ECU 26 determines whether the shift range of the transmission 40 is within the P-range or the non-P-range based on the P-position signal indicative of the operation state of the parking lock from the parking lock device 50 and outputs the determination result as the P-lock state signal to the PM-ECU 22.

Figure 2:
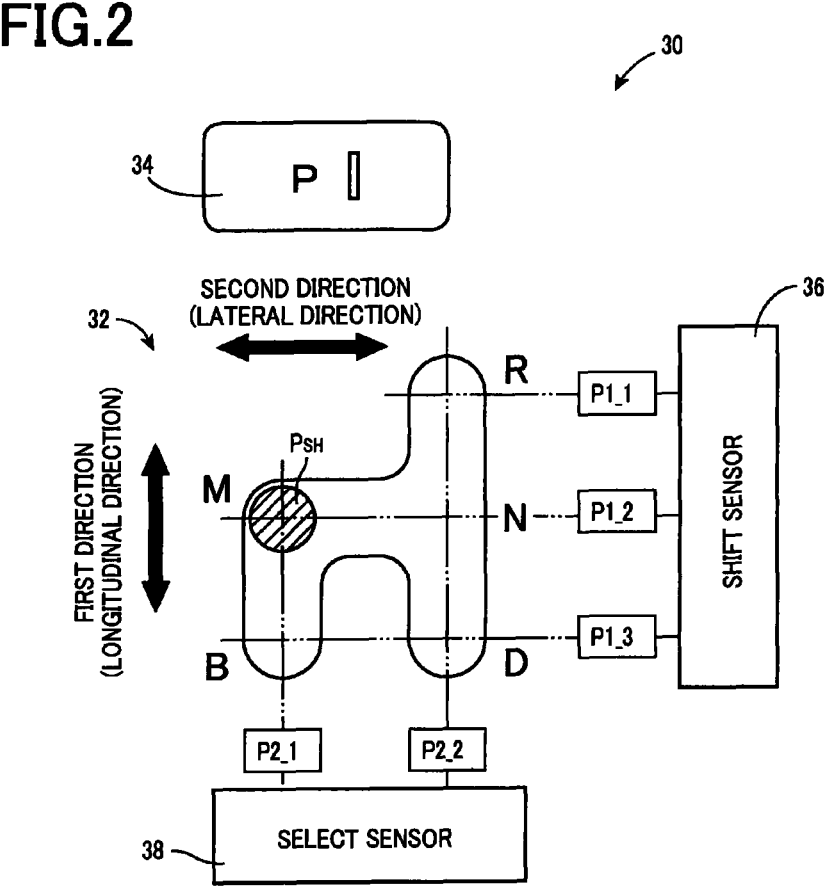
FIG. 2 is a diagram of an example of a shift operating device as a switching device that switches a plurality of types of shift ranges in a transmission through artificial operation.

FIG. 2 is a diagram of an example of the shift operating device 30 as a switching device that switches a plurality of types of shift ranges in the transmission 40 through artificial operation. This shift operating device 30 is disposed in the vicinity of a driving seat, for example, and includes the shift lever 32 as a momentary-type operation element operated to a plurality of shift positions $P_{SH}$, i.e., an automatically returning operation element that automatically returns to the original position (initial position) if an operating force is canceled. The shift operating device 30 of the embodiment includes the P-switch 34 as a momentary-type operation element for turning the shift range of the transmission 40 to the parking range (P-range) to achieve the parking lock in the vicinity of the shift lever 32.

The shift lever 32 is configured to be operated to three shift positions $P_{SH}$, i.e., an R-position, an N-position, and a D-position arranged in the front-back direction or up-down direction, i.e., the longitudinal direction of the vehicle as depicted in FIG. 2 and an M-position and a B-position arranged parallel thereto and outputs the position signal corresponding to the shift positions $P_{SH}$ to the HV-ECU 24. The shift lever 32 may be operated in the longitudinal direction between the R-position, the N-position, and the D-position, operated in the longitudinal direction between the M-position and the B-position, and operated in the lateral direction of the vehicle orthogonal to the longitudinal direction between the N-position and the B-position.

The P-switch 34 is a momentary-type push-button switch, for example, and outputs the P-switch signal to the HV-ECU 24 each time a user performs a pushing operation. For example, if the P-switch 34 is pushed when the shift range of the transmission 40 is within the non-P-range, the P-ECU 26 turns the shift range to the P-range based on the P-switchover signal from the HV-ECU 24, provided that a predetermined condition is satisfied such as a foot brake being applied and a vehicle being halted. The P-range is a parking range where the parking lock is performed to disconnect the power transmitting path in the transmission 40 and to mechanically block the rotation of drive wheels by the parking lock device 50.

The M-position of the shift operating device 30 is the initial position (home position) of the shift lever 32 and, even if the shift operation is performed to the shift positions $P_{SH}$ (R-, B-, D-, and B-positions) other than the M-position, the shift lever 32 returns to the M-position due to a mechanical mechanism such as a spring if a driver releases the shift lever 32, i.e., if an external force acting on the shift lever 32 vanishes. When the shift operating device 30 is shift-operated to the respective shift positions $P_{SH}$, the switchover is executed to the shift range corresponding to the shift position $P_{SH}$ after the shift operation based on the shift position $P_{SH}$ (the position signal) by the HV-ECU 24 and the current shift position $P_{SH}$, i.e., the state of the transmission 40 is displayed on the indicator 90.

Describing the shift ranges, an R-range selected by shift operation of the shift lever 32 to the R-position is a backward traveling range of transmitting a drive force for moving the vehicle backward to the drive wheels. A neutral range (N-range) selected by shift operation of the shift lever 32 to the N-position is a neutral range for achieving a neutral state to disconnect the power transmitting path in the transmission 40. A D-range selected by shift operation of the shift lever 32 to the D-position is a forward traveling range of transmitting a drive force for moving the vehicle forward to the drive wheels 38. For example, when the shift range is the P-range, if it is determined that the shift operation is performed to the predetermined shift position $P_{SH}$ (specifically, the R-position, the N-position, or the D-position) canceling the vehicle movement prevention (parking lock), the HV-ECU 24 outputs the P-switchover signal canceling the parking lock to the P-ECU 26. The P-ECU 26 outputs the P-switching control command signal for canceling the perking lock to the parking lock device 50 to cancel the parking lock based on the P-switchover signal from the HV-ECU 24. The HV-ECU 24 executes switchover to the shift range corresponding to the shift position $P_{SH}$ after the shift operation.

A B-range selected by shift operation of the shift lever 32 to the B-position is a decelerate forward traveling range (engine brake range) of decelerating the rotation of the drive wheels in such a way that a regeneration torque is generated in the electric motor in the D-range to exert the engine brake effect, for example. Therefore, when the current shift range is a shift range other than the D-range, if the shift lever 32 is shift-operated to the B-position, the HV-ECU 24 disables the shift operation and enables the shift operation to the B-position only when the shift range is the D-range. For example, if a driver performs the shift operation to the B-position in the P-range, the shift range remains in the P-range.

Since the shift operating device 30 of the embodiment is returned to the M-position when the external force acting on the shift lever 32 vanishes, the selected shift range is unable to be recognized by only visually checking the shift position $P_{SH}$ of the shift lever 32. Therefore, the indicator 90 is provided at a position easily viewable from a driver and the indicator 90 displays the selected shift range including the case of the P-range.

Since the shift control apparatus 10 of the embodiment employs so-called shift-by-wire and the shift operating device 30 is two-dimensionally shift-operated in a first direction that is the longitudinal direction and a second direction that is the lateral direction intersecting with (in FIG. 2, orthogonal to) the first direction, the shift control apparatus 10 includes the shift sensor 36 as a first-direction detecting unit that detects shift operation in the first direction and the select sensor 38 as a second-direction detecting unit that detects shift operation in the second direction to output the shift position $P_{SH}$ as a detection signal of a position sensor to the electronic control portion 20. Both the shift sensor 36 and the select sensor 38 output voltages as detection signals (position signals) corresponding to the shift position $P_{SH}$ to the electronic control portion 20 and the electronic control portion 20 recognizes (determines) the shift position $P_{SH}$ based on the detection signal voltages. It may be said that the first-direction detecting unit (the shift sensor 36) and the second-direction detecting unit (the select sensor 38) collectively make up a shift position detecting unit that detects the shift position $P_{SH}$ of the shift operating device 30.

Figure 3:
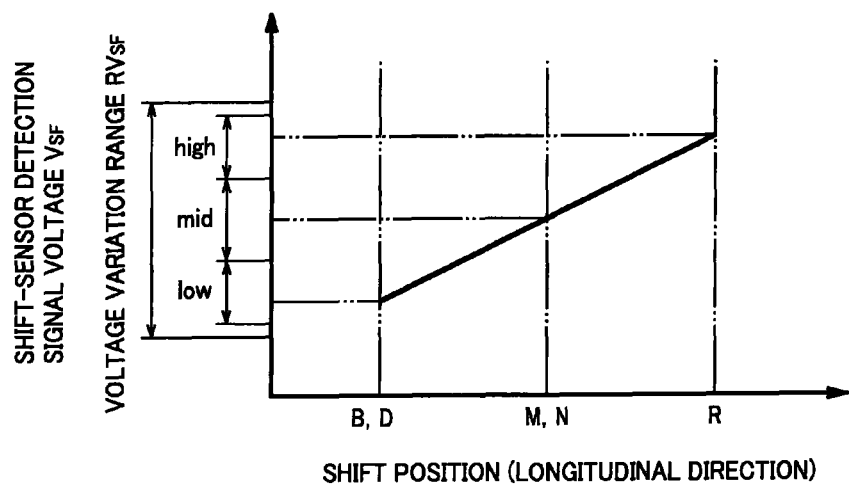
FIG. 3 is a diagram of a relationship between a shift position in the longitudinal direction of the shift operating device of FIG. 2 and a detection signal voltage of a shift sensor included in the shift operating device.
Figures 4, 5:
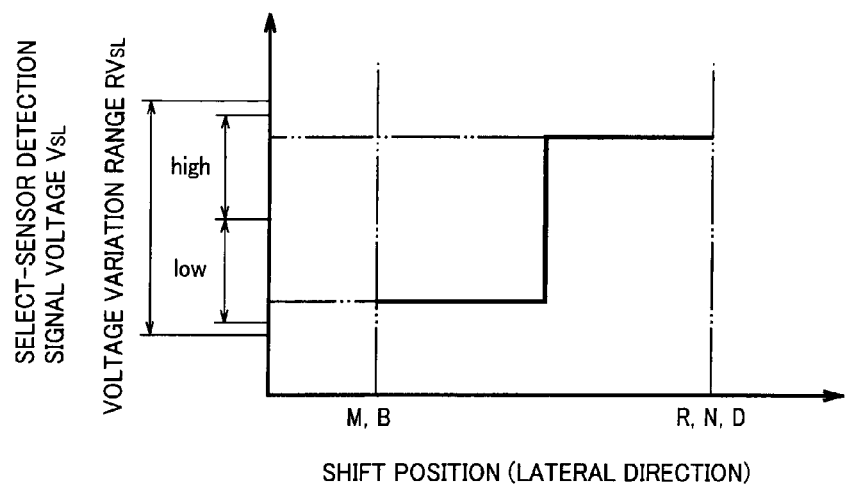
FIG. 4 is a diagram of a relationship between a shift position in the lateral direction of the shift operating device of FIG. 2 and a detection signal voltage of a select sensor included in the shift operating device.
FIG. 5 is a diagram of correlation between a combination of detection signal voltages of the shift sensor and the select sensor and a shift position in the transmission of FIG. 1.

By way of example of recognition of the shift position $P_{SH}$, a detection signal voltage $V_{SF}$ of the shift sensor 36 turns to a voltage within a low range when the shift position $P_{SH}$ in the longitudinal direction (the first direction) is the B- or D-position, to a voltage within a mid-range higher than the low range in the case of the M- or N-position, and to a voltage within a high range higher than the mid-range in the case of the R-position, as depicted in FIG. 3. A detection signal voltage $V_{SL}$ of the select sensor 38 turns to a voltage within a low range when the shift position $P_{SH}$ in the lateral direction (the second direction) is the M- or B-position and to a voltage within a high range higher than the low range in the case of the R-, N-, or D-position, as depicted in FIG. 4. The HV-ECU 24 detects the detection signal voltages $V_{SF}$, $V_{SL}$ changing as above to recognize that the shift position $P_{SH}$ is the N-position if "$V_{SF}$=mid, $V_{SL}$=high", that the shift position $P_{SH}$ is the R-position if "$V_{SF}$=high, $V_{SL}$=high", that the shift position $P_{SH}$ is the D-position if "$V_{SF}$=low, $V_{SL}$=high", that the shift position $P_{SH}$ is the M-position if "$V_{SF}$=mid, $V_{SL}$=low", and that the shift position $P_{SH}$ is the B-position if "$V_{SF}$=low, $V_{SL}$=low", as depicted in a chart of FIG. 5. Although the low range, the mid-range, and the high range are continuous ranges in FIG. 3, an indeterminable blind zone may be provided between the ranges. The characteristics of the detection signal voltage $V_{SF}$ of the shift sensor 36, i.e., the low-to-high characteristics for the shift position $P_{SH}$ in the longitudinal direction may be inversed high-to-low characteristics. Similarly, although the low range and the high range are continuous ranges in FIG. 4, an indeterminable blind zone may be provided between the ranges. The characteristics of the detection signal voltage $V_{SL}$ of the select sensor 38, i.e., the low-to-high characteristics for the shift position $P_{SH}$ in the lateral direction may be inversed high-to-low characteristics.

Although the shift position $P_{SH}$ is recognized by the HV-ECU 24 in this way, when the shift operation to each of the shift positions $P_{SH}$ is performed, the switchover is not immediately executed to the shift range corresponding to the shift position $P_{SH}$ and a certain range ascertainment time (shift operation ascertainment time) is set in advance for each of the shift positions $P_{SH}$ or the shift ranges for prevention of erroneous operation, erroneous recognition (determination), etc. For example, if a staying time, i.e., a time of the shift lever 32 staying at the shift position $P_{SH}$ after the shift operation becomes equal to or longer than the certain range ascertainment time, the HV-ECU 24 ascertains the shift operation and executes switchover to the shift range corresponding to the shift position $P_{SH}$ after the shift operation. Taking the case of switching from the P-range to the N-range as an example, when the shift operation is performed from the M-position to the N-position while the shift rage is the P-range, the HV-ECU 24 ascertains (determines) that the shift position $P_{SH}$ after the shift operation is the N-position and switches the shift range of the transmission 40 from the P-range to the N-range if the staying time of the shift lever 32 at the N-position becomes equal to or longer than a neutral range ascertainment time that is the certain range ascertainment time for ascertaining the shift operation to the N-position.

If both the shift sensor 36 and the select sensor 38 are normal, the switchover may be executed to the shift range corresponding to the shift position $P_{SH}$ based on the detection signals from the both position sensors 36, 38. However, for this purpose, it must be determined whether each of the shift sensor 36 and the select sensor 38 is normal or abnormal. Therefore, to detect an abnormality (malfunction, failure) due to disconnection or short circuit of the shift sensor 36 and the select sensor 38, respective voltage variation ranges $RV_{SF}$, $RV_{SL}$ (see FIGS. 3 and 4) including the possible detection signal voltages $V_{SF}$, $V_{SL}$ at all the shift positions $P_{SH}$ are empirically set in advance for the shift sensor 36 and the select sensor 38. If the detection signal voltages $V_{SF}$, $V_{SL}$ depart from the voltage variation ranges $RV_{SF}$, $RV_{SL}$, the electronic control portion 20 (the HV-ECU 24) determines that the position sensors (the shift sensor 36 and/or the select sensor 38) are abnormal. If it is determined that the position sensor is abnormal, the electronic control portion 20 executes the fail-safe operation corresponding to each abnormality. For example, if it is determined that one of the shift sensor 36 and the select sensor 38 is abnormal when the shift range is the P-range, the electronic control portion 20 switches the shift range from the P-range based on the detection signal from the other normal position sensor 36 or 38 so as to cancel the parking lock with the shift operation by a driver. An example of the fail-safe operation will hereinafter be described.

If an abnormality of the select sensor 38 is detected, the shift position $P_{SH}$ in the second direction (see FIG. 2) (hereinafter, "second-direction shift position $P2_{SH}$") becomes uncertain and the HV-ECU 24 is able to recognize only the shift position $P_{SH}$ in the first direction (see FIG. 2) (hereinafter, "first-direction shift position $P1_{SH}$"). The HV-ECU 24 is able to distinguish a first-direction first position P1_1 indicative of the R-position, a first-direction second position P1_2 indicative of the M-position or the N-position, and a first-direction third position P1_3 indicative of the B-position or the D-position for the first-direction shift position $P1_{SH}$. In this case, it is preliminarily defined that a neutral position, i.e., the first-direction second position P1_2 including the M-position (initial position) is a preoperational position $P_{LT}$. If the first-direction shift position $P1_{SH}$ is changed from the first-direction second position P1_2 to another position, which is the first-direction first position P1_1 or the first-direction third position P1_3 after the abnormality of the select sensor 38 is detected, the HV-ECU 24 determines that the shift lever 32 is subjected to the shift operation by a driver.

If an abnormality of the shift sensor 36 is detected, the first-direction shift position $P1_{SH}$ becomes uncertain and the HV-ECU 24 is able to recognize only the second-direction shift position $P2_{SH}$. The HV-ECU 24 is able to distinguish a second-direction first position P2_1 indicative of the M-position or the B-position and a second-direction second position P2_2 indicative of the R-position, the N-position, or the D-position for the second-direction shift position $P2_{SH}$. In this case, it is preliminarily defined that the second-direction first position P2_1 including the M-position (initial position) is the preoperational position $P_{LT}$. If the second-direction shift position $P2_{SH}$ is changed from the second-direction first position P2_1 to another position, which is the second-direction second position P2_2 after the abnormality of the shift sensor 36 is detected, the HV-ECU 24 determines that the shift lever 32 is subjected to the shift operation by a driver.

If an abnormality of at least one of the shift sensor 36 and the select sensor 38 is detected, the HV-ECU 24 recognizes the safety direction by replacing the shift position $P_{SH}$ as needed. A specific recognition pattern of the HV-ECU 24 for the shift position $P_{SH}$ will be described with reference to FIG. 6. FIG. 6 is a chart for explaining the shift position $P_{SH}$ recognized by the HV-ECU 24 when a sensor abnormality is determined in the P-range of the shift range and a field [1] of FIG. 6 depicts the recognized shift position $P_{SH}$ when the shift sensor 36 and the select sensor 38 are normal as a reference.

In FIG. 6, the actual shift position $P_{SH}$ is identical to the shift position $P_{SH}$ recognized by the HV-ECU 24 in the field [1]. As depicted in a field [2] of FIG. 6, when the shift sensor 36 is abnormal (failed) and the select sensor 38 is not abnormal, i.e., normal, if the actual shift position $P_{SH}$ is the M-position or the B-position, these positions are included in the second-direction first position P2_1 and it is uncertain whether the shift operation is actually performed from the M-position (initial position) and, therefore, the HV-ECU 24 recognizes the shift position $P_{SH}$ as the M-position. On the other hand, if the actual shift position $P_{SH}$ after the shift operation from the second-direction first position P2_1 (the preoperational position $P_{LT}$) is the N-position, the R-position, or the D-position, the HV-ECU 24 may determine that the shift lever 32 is subjected to the shift operation by a driver and, therefore, the HV-ECU 24 recognizes the shift position $P_{SH}$ as the N-position.

Both fields [3], [4] of FIG. 6 are filled in on the basis that the shift sensor 36 is normal. As depicted in a field [3] of FIG. 6, when the select sensor 38 is abnormal (failed) and the select sensor fail-safe is prohibited, if the actual shift position $P_{SH}$ is the N-position, the R-position, or the M-position, the HV-ECU 24 recognizes that the shift position $P_{SH}$ is the M-position, and if the actual shift position $P_{SH}$ is the D-position or the B-position, the HV-ECU 24 recognizes that the shift position $P_{SH}$ is the B-position. If the recognized shift position $P_{SH}$ changes to either the B-position or the M-position in the P-range, the P-range is continued. On the other hand, as depicted in a field [4] of FIG. 6, when the select sensor 38 is abnormal (failed) and the select sensor fail-safe is permitted, if the actual shift position $P_{SH}$ is the N-position or the M-position, the HV-ECU 24 recognizes that the shift position $P_{SH}$ is the M-position, and if the actual shift position $P_{SH}$ is the R-position, the D-position, or the B-position, the HV-ECU 24 recognizes that the shift position $P_{SH}$ is the N-position in a replacing manner.

As depicted in a field [5] of FIG. 6, when the shift sensor 36 is abnormal (failed) and the select sensor 38 is abnormal (failed), since it is uncertain what is the actual shift position $P_{SH}$ after the shift operation, the HV-ECU 24 recognizes that the shift position $P_{SH}$ is the M-position regardless of the actual shift position $P_{SH}$ without determined that the shift lever 32 is subjected to the shift operation by a driver. Therefore, if both the shift sensor 36 and the select sensor 38 are abnormal, when the current shift range is, for example, the P-range, the P-range is continued regardless of the actual shift position $P_{SH}$.

Figure 7:
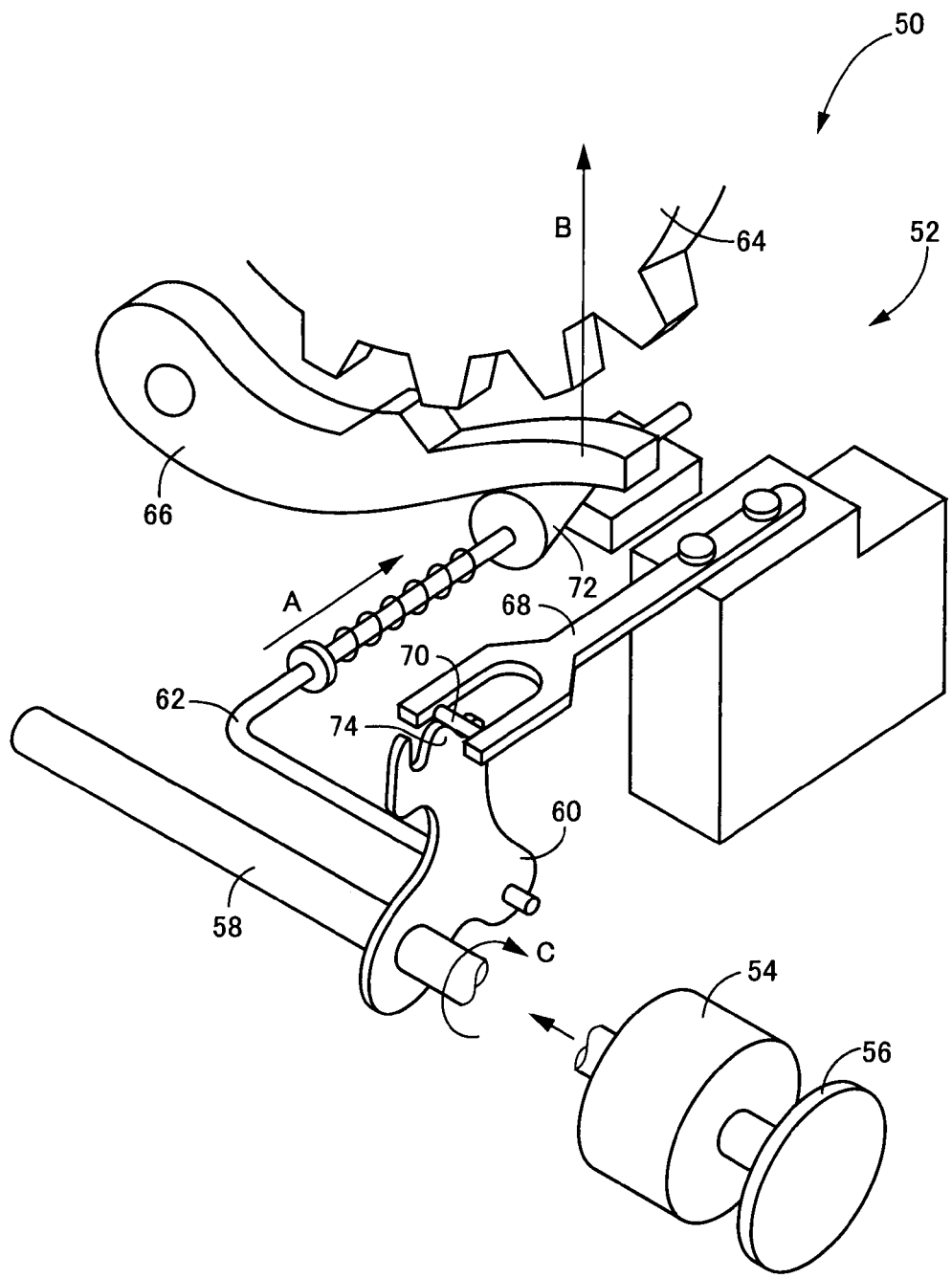
FIG. 7 is a diagram for explaining a configuration of a parking lock device that mechanically blocks rotation of drive wheels.

FIG. 7 is a diagram for explaining a configuration of the parking lock device 50 that mechanically blocks the rotation of the drive wheels. In FIG. 7, the parking lock device 50 includes a P-lock mechanism 52, a P-lock drive motor 54, an encoder 56, etc., and is an actuator operated for preventing the vehicle movement based on the control signal from the electronic control portion 20.

The P-lock drive motor 54 is made up of a switch reluctance motor (SR motor) and drives the P-lock mechanism 52 through the shift-by-wire system in response to a command (control signal) from the P-ECU 26. The encoder 56 is a rotary encoder that outputs A-phase, B-phase, and Z-phase signals, rotates with the P-lock drive motor 54 in an integrated manner, and detects a rotation state of the SR motor to supply a signal indicative of the rotation state, i.e., a pulse signal for acquiring a counted value (encoder count) corresponding to a movement amount (rotation amount) of the P-lock drive motor 54 to the P-ECU 26. The P-ECU 26 acquires the signal supplied from the encoder 56 to comprehend the rotation state of the SR motor and controls power distribution for driving the SR motor.

The P-lock mechanism 52 includes a shaft 58 rotated and driven by the P-lock drive motor 54, a detent plate 60 that rotates in accordance with the rotation of the shaft 58, a rod 62 that operates in accordance with the rotation of the detent plate 60, a parking gear 64 that rotates in conjunction with the drive wheels, a parking lock pole 66 for blocking (locking) the rotation of the parking gear 64, a detent spring 68 that limits the rotation of the detent plate 60 to fix the shift position, and a skid 70. Although the disposition location is not limited as long as a relationship is formed such that the drive wheels are locked when the parking gear 64 is locked, the parking gear 64 is fixed to an output rotation member of the transmission 40, for example.

The detent plate 60 is operatively coupled to a drive shaft of the P-lock drive motor 54 via the shaft 58 and is driven be the P-lock drive motor 54 along with the rod 62, the detent spring 68, and the skid 70 to function as a parking lock positioning member for switchover between a parking lock position corresponding to the P-range and a non-parking lock position corresponding to the shift ranges other than the P-range. The shaft 58, the detent plate 60, the rod 62, the detent spring 68, and the skid 70 act as a parking lock switching mechanism.

FIG. 7 depicts the state in the case of the non-parking lock position. Since the parking lock pole 66 does not lock the parking gear 64 in this state, the rotation of the drive wheels is not prevented by the P-lock mechanism 52. If the shaft 58 is rotated by the P-lock drive motor 54 from this state in the direction of an arrow C depicted in FIG. 7, the rod 62 is pushed via the detent plate 60 in the direction of an arrow A depicted in FIG. 7 and a taper member 72 provided at a tip of the rod 62 pushes up the parking lock pole 66 in the direction of an arrow B depicted in FIG. 7. As the detent plate 60 rotates, the skid 70 of the detent spring 68 is relocated from one of two valleys provided at the top of the detent plate 60, i.e., the non-parking lock position, climbing over a ridge 74 to the other valley, i.e., the parking lock position. The skid 70 is provided on the detent spring 68 so as to rotate around the shaft center thereof. When the detent plate 60 is rotated until the skid 70 comes to the parking lock position, the parking lock pole 66 is pushed up to the position of engagement with the parking gear 64. This mechanically prevents the rotation of the drive wheels rotating in conjunction with the parking gear 64 and the shift range is switched to the P-range.

At this point, separately from the abnormality of the position sensors 36, 38 causing the detection signal voltages $V_{SF}$, $V_{SL}$ from the position sensors 36, 38 departing from the voltage variation ranges $RV_{SF}$, $RV_{SL}$, the shift operating device 30 may have an abnormality causing so-called ON-fixation resulting in no voltage change corresponding to the user's operation of the shift lever 32 even though the detection signal voltages $V_{SF}$, $V_{SL}$ are within the voltage variation ranges $RV_{SF}$, $RV_{SL}$. Since the position sensors 36, 38 output the detection signal voltages $V_{SF}$, $V_{SL}$ within the normal ranges in the case of such an abnormality causing the ON-fixation, it is difficult to determine whether the sensor output is due to the ON-fixation or driver's operation. For example, from the detection signal voltages $V_{SF}$, $V_{SL}$ when a vehicle is powered on while the shift lever 32 is in the operated state at the shift position $P_{SH}$ other than the initial position, it is difficult to determine whether the sensor output due to the ON-fixation or the sensor output corresponding to the user's operation.

For such a problem, to prevent erroneous determination (recognition) of the shift operation due to the ON-fixation, if the shift position $P_{SH}$ is changed, for example, if at least one voltage of the detection signal voltages $V_{SF}$, $V_{SL}$ is changed, the HV-ECU 24 recognizes (determines) the shift position $P_{SH}$ based on both of the detection signal voltages $V_{SF}$, $V_{SL}$ after the change in the shift position $P_{SH}$, i.e., the change in the voltage and executes switchover to the shift range corresponding to the shift position $P_{SH}$ after the shift operation. Therefore, when the vehicle power-off is turned to the vehicle power-on while the shift lever 32 is in the operated state at the shift position $P_{SH}$ other than the initial position, the HV-ECU 24 does not accept (i.e., rejects) both of the detection signal voltages $V_{SF}$, $V_{SL}$ based on the shift operation to disable the shift operation. The HV-ECU 24 does not executes the switchover of the shift range of the transmission 40 corresponding to the shift operation while the shift lever 32 is in the operated state at the shift position $P_{SH}$ other than the initial position at the time of the vehicle power-on. For example, if a user pushes the vehicle power switch 80 to turn the vehicle power-off to the vehicle power-on in the P-range with the shift operation to the N-position being executed, the shift range remains in the P-range.

This may not accommodate a request of a user who has operated the shift lever 32 to the shift position $P_{SH}$ other than the initial position at the time of the vehicle power-on with the intention to switch the shift range of the transmission 40 immediately at the time of the vehicle power-on, for example, and the convenience may be reduced. From another viewpoint, even if the abnormality of the position sensors 36, 38 or the ON-fixation actually occurs causing the detection signal voltages $V_{SF}$, $V_{SL}$ departing from the voltage variation ranges $RV_{SF}$, $RV_{SL}$, the above fail-safe operation to be executed at the time of abnormality of the sensor output is not executed immediately at the time of the vehicle power-on, and the switchover to an appropriate shift range may be delayed at the time of abnormality. The above fail-safe operation may be executed at the time of sensor abnormality causing the ON-fixation.

Therefore, in this embodiment, the electronic control portion 20 (e.g., the HV-ECU 24) stores a determination result acquired when it is determined whether the detection signal voltages $V_{SF}$, $V_{SL}$ are normal or abnormal. For example, the electronic control portion 20 (e.g., the HV-ECU 24) temporarily stores the determination result in RAM. If the memory of the determination result is retained when the vehicle is powered on, the electronic control portion 20 (e.g., the HV-ECU 24) determines the shift position $P_{SH}$ based on the detection signal voltages $V_{SF}$, $V_{SL}$ at the time of the vehicle power-on to execute the switchover to the shift range corresponding to the shift position $P_{SH}$. On the other hand, if the memory of the determination result is not retained, the electronic control portion 20 (e.g., the HV-ECU 24) does not determine the shift position $P_{SH}$ based on the detection signal voltages $V_{SF}$, $V_{SL}$ at the time of the vehicle power-on. The detection signal voltages $V_{SF}$, $V_{SL}$ at the time of the vehicle power-on are made invalid and the shift range is not switched based on the detection signal voltages $V_{SF}$, $V_{SL}$ at the time of the vehicle power-on. If at least one voltage of the detection signal voltages $V_{SF}$, $V_{SL}$ is changed at the time of the vehicle power-on, the electronic control portion 20 (e.g., the HV-ECU 24) recognizes (determines) the shift position $P_{SH}$ based on both of the detection signal voltages $V_{SF}$, $V_{SL}$ after the voltage change to execute switchover to the shift range corresponding to the shift position $P_{SH}$ after the shift operation. If it is unknown whether the sensor output is normal or abnormal, it must first be determined whether the sensor output is normal or abnormal and, therefore, the switchover of the shift range is not executed based on the detection signal voltages $V_{SF}$, $V_{SL}$ at the time of the vehicle power-on. In other words, if it is known whether the sensor output is normal or abnormal, it is unnecessary to determine whether the sensor output is normal or abnormal and, therefore, the switchover of the shift range is immediately executed based on the detection signal voltages $V_{SF}$, $V_{SL}$ at the time of the vehicle power-on. Therefore, when the memory of the determination result is retained and if the memory of the determination result indicates that the sensor output is normal, the shift position $P_{SH}$ is immediately determined based on the detection signal voltages $V_{SF}$, $V_{SL}$ at the time of the vehicle power-on to execute the switchover to the shift range corresponding to the shift position $P_{SH}$. When the memory of the determination result is retained and if the memory of the determination result indicates that the sensor output is abnormal, the fail-safe operation is immediately executed for the switchover to the shift range corresponding to the time of the sensor failure based on the detection signal voltages $V_{SF}$, $V_{SL}$ at the time of the vehicle power-on. On the other hand, if the memory of the determination result is not retained, the shift range is avoided from being switched based on the detection signal voltages $V_{SF}$, $V_{SL}$ not determined whether normal or abnormal. For example, the erroneous determination (recognition) of shift operation due to the ON-fixation is prevented. The shift range is properly switched in accordance with the detection signal voltages $V_{SF}$, $V_{SL}$ determined whether normal or abnormal.

Since the shift range of the transmission 40 is switched when the shift lever 32 is operated to the shift position $P_{SH}$ other than the initial position, if the shift lever 32 is located at the shift position $P_{SH}$ other than the initial position when the vehicle is powered on, the electronic control portion 20 (e.g., the HV-ECU 24) may perform the control operation for executing the switchover of the shift range based on whether the above memory of the determination result is retained as to whether the sensor output is normal or abnormal.

To increase the opportunity to execute the switchover of the shift range based on the detection signal voltages $V_{SF}$, $V_{SL}$ at the time of the vehicle power-on, the electronic control portion 20 (e.g., the HV-ECU 24) is able to retain the memory of the determination result regardless of the state of the vehicle electric power supply, i.e., even if the vehicle is powered off. For example, to retain the memory of the determination result when the vehicle is powered on before a certain time has elapsed after the vehicle power-off, the HV-ECU 24 is enabled to supply electric power from a self-retention circuit, etc., to retain at least the memory until the elapse of a predetermined time empirically obtained and stored in advance for enabling the execution of the switchover of the shift range of the transmission 40 based on the shift position $P_{SH}$ at the time of the vehicle power-on after the vehicle is powered off by the PM-ECU 22.

Figure 8:
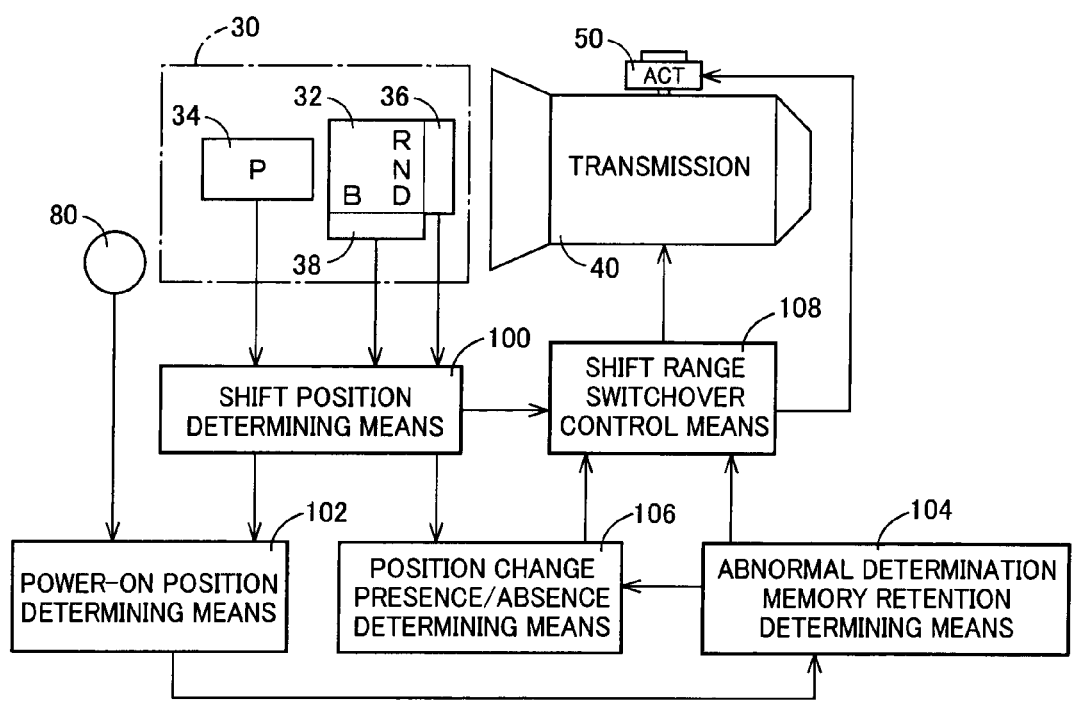
FIG. 8 is a functional block diagram for explaining a main part of the control function of the electronic control portion of FIG. 1.

FIG. 8 is a functional block diagram for explaining a main part of the control function of the shift control apparatus 10 (the electronic control portion 20). In FIG. 8, a shift position determining unit, i.e., a shift position determining means 100 determines the shift position $P_{SH}$ based on the detection signal voltages $V_{SF}$, $V_{SL}$ from the shift sensor 36 and the select sensor 38.

A power-on position determining unit, i.e., a power-on position determining means 102 determines whether the shift position $P_{SH}$ is located at other than the initial position (M-position) when the vehicle power switch 80 is operated to power on the vehicle at the time of the vehicle power-off. For example, the power-on position determining means 102 determines whether the vehicle power switch 80 is operated at the time of the vehicle power-off and whether the shift position $P_{SH}$ determined by the shift position determining means 100 is located at other than the initial position (M-position).

An abnormal determination memory retention determining unit, i.e., an abnormal determination memory retention determining means 104 determines whether the memory of the determination result is retained as to the determination of whether the sensor outputs (the detection signal voltages $V_{SF}$, $V_{SL}$) are normal or abnormal.

A position change presence/absence determining unit, i.e., a position change presence/absence determining means 106 determines whether the shift position $P_{SH}$ determined by the shift position determining means 100 is changed.

A shift range switchover control portion, i.e., a shift range switchover control means 108 executes the switchover to the shift range corresponding to the shift position $P_{SH}$ determined based on the detection signal voltages $V_{SF}$, $V_{SL}$ at the time of the vehicle power-on by the shift position determining means 100 if the abnormal determination memory retention determining means 104 determines that the memory of the determination result is retained. For example, if the sensor outputs (detection signal voltages $V_{SF}$, $V_{SL}$) are normal, the shift range switchover control means 108 executes the switchover to the shift range corresponding to the shift position $P_{SH}$ determined based on the detection signal voltages $V_{SF}$, $V_{SL}$ at the time of the vehicle power-on. If the sensor outputs (detection signal voltages $V_{SF}$, $V_{SL}$) are abnormal, the shift range switchover control means 108 executes the fail-safe operation for the switchover to the shift range corresponding to the time of the sensor failure based on the detection signal voltages $V_{SF}$, $V_{SL}$ at the time of the vehicle power-on.

On the other hand, if the abnormal determination memory retention determining means 104 determines that the memory of the determination result is not retained, the shift range switchover control means 108 does not accept the shift position $P_{SH}$ determined by the shift position determining means 100 to disable the shift operation until the position change presence/absence determining means 106 determines that the shift position $P_{SH}$ is changed. If abnormal determination memory retention determining means 104 determines that the memory of the determination result is not retained, the shift range switchover control means 108 executes the switchover to the shift range corresponding to the shift position $P_{SH}$ after the change determined by the shift position determining means 100, provided that the position change presence/absence determining means 106 determines that the shift position $P_{SH}$ is changed.

Figure 9:
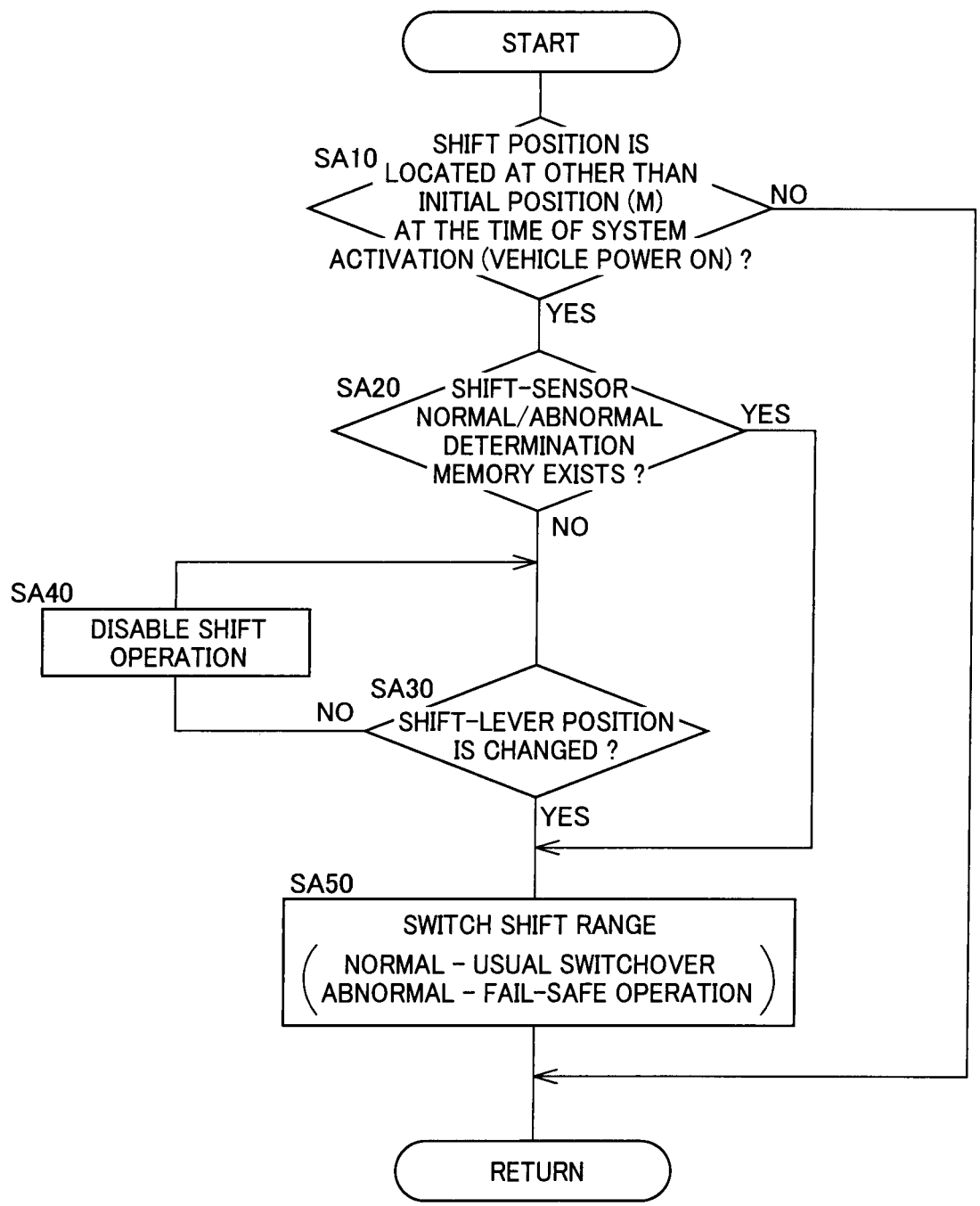
FIG. 9 is a flowchart for explaining the control operation for improving the user's convenience in the electric switching control of the shift range of the transmission based on the shift position in the main part of the control operation of the electronic control portion, i.e., the shift operating device.

FIG. 9 is a flowchart for explaining the control operation for improving the user's convenience in the electric switching control of the shift range of the transmission 40 based on the shift position $P_{SH}$ in the main part of the control operation of the electronic control portion 20, i.e., the shift operating device 30 and the operation is repeatedly executed in a very short cycle time on the order of a few msec to several tens of msec, for example.

First, at step SA10 (hereinafter, step is omitted) corresponding to the power-on position determining means 102, it is determined whether the shift position $P_{SH}$ is located at other than the initial position (M-position) when the vehicle power switch 80 is operated to power on the vehicle at the time of the vehicle power-off. If the determination at SA10 is negative, this routine is terminated, and if the determination is positive, it is determined whether the memory of the determination result is retained as to the determination of whether the sensor outputs (the detection signal voltages $V_{SF}$, $V_{SL}$) are normal or abnormal at SA20 corresponding to the abnormal determination memory retention determining means 104. If the determination at SA20 is negative, it is determined whether the shift position $P_{SH}$ determined at the time of the vehicle power-on is changed at SA30 corresponding to the position change presence/absence determining means 106. If the determination at SA30 is negative, the shift position $P_{SH}$ determined at the time of the vehicle power-on is not accepted to disable the shift operation at SA40 corresponding to the shift range switchover control means 108. Conversely, if the determination at SA30 is positive, the switchover is executed to the shift range corresponding to the changed shift position $P_{SH}$ changed from the shift position $P_{SH}$ determined at the time of the vehicle power-on at SA50 also corresponding to the shift range switchover control means 108.

On the other hand, if the determination at SA20 is positive, the switchover is executed to the shift range corresponding to the shift position $P_{SH}$ determined based on the detection signal voltages $V_{SF}$, $V_{SL}$ at the time of the vehicle power-on at SA50 also corresponding to the shift range switchover control means 108. For example, if the sensor outputs (detection signal voltages $V_{SF}$, $V_{SL}$) are normal, the switchover is executed to the shift range corresponding to the shift position $P_{SH}$ determined based on the detection signal voltages $V_{SF}$, $V_{SL}$ at the time of the vehicle power-on. If the sensor outputs (detection signal voltages $V_{SF}$, $V_{SL}$) are abnormal, the fail-safe operation is executed for the switchover to the shift range corresponding to the time of the sensor failure based on the detection signal voltages $V_{SF}$, $V_{SL}$ at the time of the vehicle power-on.

As described above, according to this embodiment, if the memory is retained for the determination result of whether the sensor output (detection signal voltages $V_{SF}$, $V_{SL}$) of the shift position $P_{SH}$ in the shift operating device 30 is normal or abnormal, the switchover of the shift range of the transmission 40 is executed based on the sensor output when it is under the vehicle power-on and, therefore, the switchover is immediately executed to the shift range of the transmission 40 corresponding to the shift position $P_{SH}$ at the time of the vehicle power-on. For example, since the switchover is executed to the shift range of the transmission 40 corresponding to the shift position $P_{SH}$ already changed by the user's operation at the time of the vehicle power-on rather than subsequently to the detection (determination) of a change in the shift position $P_{SH}$ after the vehicle power-on, the request may be accommodated for a user who wants to immediately switch the shift range of the transmission 40, that is, a response to the operation of the user is given immediately, and the user's convenience is improved. More specifically, if a determination result is retained indicating that the sensor output is normal, the switchover to the shift range at the time of normal control (at the normal time) is executed correspondingly to the shift position $P_{SH}$ already changed by the user's operation at the time of the vehicle power-on. If a determination result is retained to indicate that the sensor output is abnormal, the fail-safe operation is immediately executed at the time of the vehicle power-on, and the switchover to an appropriate shift range suitable for the abnormal time is promptly executed. On the other hand, if the memory of the determination result is not retained, since the switchover of the shift range of the transmission 40 is not executed based on the sensor output when the vehicle is powered on, the shift range is avoided from being switched in accordance with a sensor output not determined as to whether normal or abnormal. For example, at the time of the abnormality causing the ON-fixation in the shift operating device 30, the switchover to the same shift range as the normal control is avoided from being executed based on the abnormal sensor output at that point.

According to this embodiment, if the memory of the determination result is not retained, the shift range is switched based on a changed sensor output, provided that the sensor output is changed after the vehicle electric power supply is turned on. This enables the shift range of the transmission 40 to be properly switched in accordance with the sensor output determined whether normal or abnormal, for example.

According to this embodiment, the memory of the determination result is retainable regardless of a state of the vehicle electric power supply. This increases the opportunity that enables the switchover of the shift range of the transmission 40 to be executed based on the shift position $P_{SH}$ in the shift operating device 30 at the time of the vehicle power-on.

According to this embodiment, the memory of the determination result is retained until a predetermined time has elapsed after the vehicle electric power supply was turned off. This enables the switchover of the shift range of the transmission 40 to be executed based on the shift position $P_{SH}$ in the shift operating device 30 at the time of vehicle power-on if the vehicle is powered on before a certain time has elapsed after the vehicle electric power supply is put into the off-state (vehicle power-off).

According to this embodiment, the shift operating device 30 includes a momentary-type shift lever 32 returned to an initial position while an external force is not applied, and if the shift lever 32 is located in an shift position $P_{SH}$ other than the initial position when the vehicle electric power supply is turned on, the shift range is switched based on whether the memory of the determination result is retained. This causes the switchover to be properly executed to the shift range of the transmission 40 corresponding to an shift position $P_{SH}$ other than the initial position already changed since the user operates an shift lever 32 when the vehicle is turned on.

Another embodiment of the present invention will then be described. In the following description, portions mutual and common to embodiments are denoted by the same reference numerals and will not be described.

Second Embodiment

In the above embodiment, the switchover of the shift range of the transmission 40 is executed based on whether the HV-ECU 24 retains the memory of the determination result as to whether the sensor outputs (detection signal voltages $V_{SF}$, $V_{SL}$) are normal or abnormal, for example. Whether the HV-ECU 24 retains the memory of the determination result may represent not only an aspect of whether the HV-ECU 24 has been turned on with the direct purpose of retaining the memory of the determination result in the HV-ECU 24, but also an aspect of whether the memory of the determination result is retained as a result of whether the HV-ECU 24 has been turned on for any other purposes.

Figure 10:
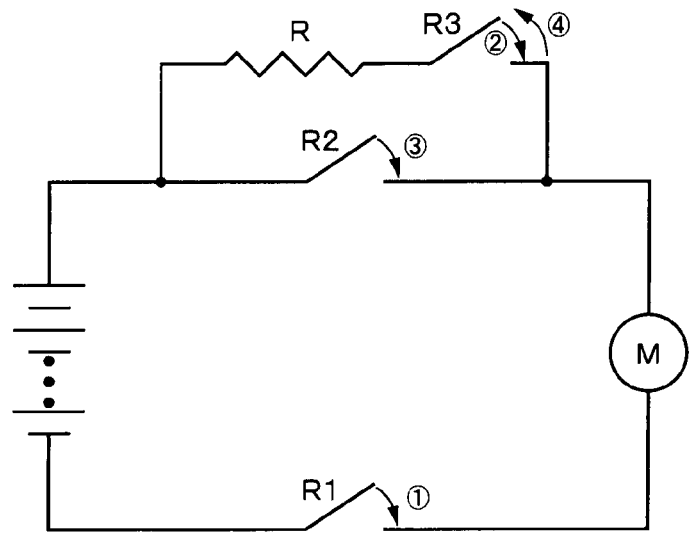
FIG. 10 is a schematic diagram of an electric circuit for driving an electric motor making up the transmission controlled by the electronic control portion.

FIG. 10 is a schematic diagram of an electric circuit for driving an electric motor M making up the transmission 40 controlled by the HV-ECU 24. In FIG. 10, for example, if the PM-ECU 22 detects input of the power switch signal from the vehicle power switch 80 during the vehicle power-off and the vehicle is powered on, the HV-ECU 24 operates relays in the electric circuit in the order of circled numbers 1 to 4 of FIG. 10. This constrains an inrush current to the electric motor M with a limiting resistor R at the time of the vehicle power-on and the durability of the electric motor M is improved. If the PM-ECU 22 detects input of the power switch signal from the vehicle power switch 80 during the vehicle power-on and the vehicle is powered off, the HV-ECU 24 switches off the relays R1, R2 to achieve the state of the relays R1, R2, and R3 as depicted in FIG. 10. Therefore, if the vehicle power-on and the vehicle power-off are repeatedly and frequently executed over a short time, an electric current is applied to the limiting resistor R in each case and the heat generation amount of the limiting resistor R is increased. Therefore, the HV-ECU 24 maintains the on-state of the relays R1, R2 without switching off the relays R1, R2 for a predetermined time empirically obtained and stored in advance for protecting the limiting resistor R from overheat even if the PM=ECU 22 powers off the vehicle (this is referred to as a limiting resistor overheat protection mode). As a result, the electric power supply of the HV-ECU 24 is maintained in the on-state (the HV-ECU power-on) not only during the vehicle power-on of course, but also until the predetermined time has elapsed after the vehicle power-off by the PM-ECU 22. While the HV-ECU power-on is continued, i.e., during the limiting resistor overheat protection mode, the HV-ECU 24 is able to retain the memory of the determination result. Even during the vehicle power-on, it is considered that the limiting resistor overheat protection mode is activated when the relays R1, R2 are maintained in the on-state.

Therefore, in this embodiment, if the HV-ECU 24 is operated for improving the durability of equipments making up the transmission 40 even during the vehicle power-off, i.e., the HV-ECU power-on is continued in the limiting resistor overheat protection mode, the switchover of the shift range of the transmission 40 is executed based on the sensor outputs (the detection signal voltages $V_{SF}$, $V_{SL}$) at the time of vehicle power-on.

Figure 11:
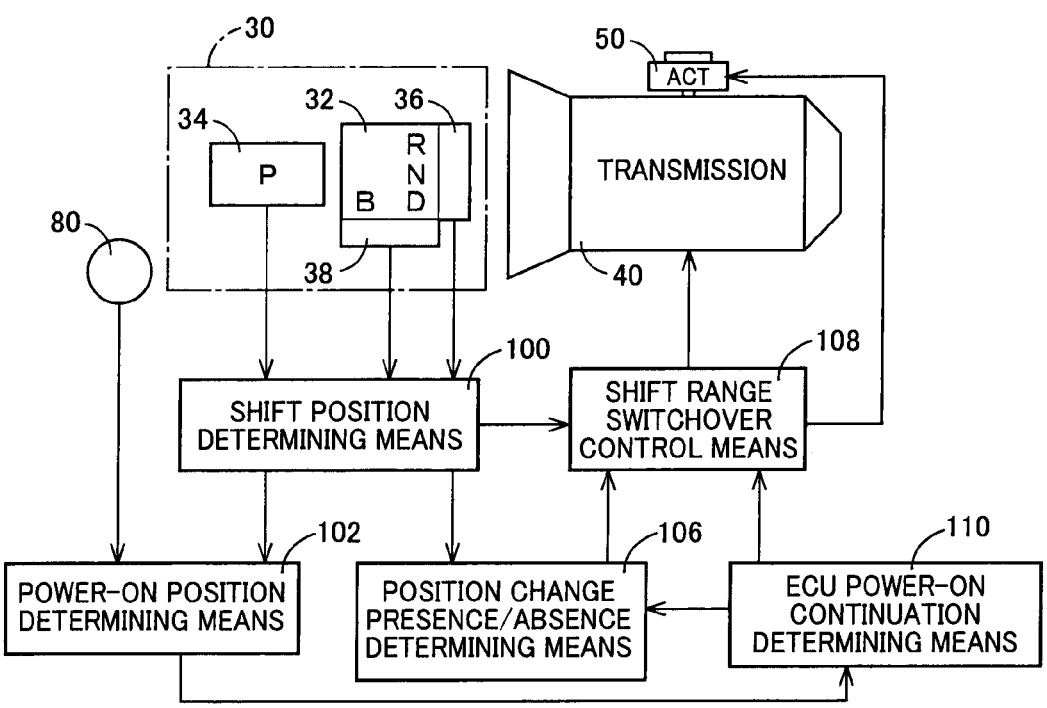
FIG. 11 is a functional block diagram for explaining the main part of the control function of the electronic control portion of FIG. 1, depicting another embodiment corresponding to FIG. 8.

FIG. 11 is a functional block diagram for explaining the main part of the control function of the shift control apparatus 10 (the electronic control portion 20). In the functional block diagram of FIG. 11, only the abnormal determination memory retention determining means 104 is replaced with an ECU power-on continuation determining means 110 and other means are the same as compared to the functional block diagram of FIG. 8. The ECU power-on continuation determining means 110 determines whether the HV-ECU power-on is being continued, i.e., whether the limiting resistor overheat protection mode is activated.

FIG. 12 is a flowchart for explaining the control operation for improving the user's convenience in the electric switching control of the shift range of the transmission 40 based on the shift position $P_{SH}$ in the main part of the control operation of the electronic control portion 20, i.e., the shift operating device 30 and the operation is repeatedly executed in a very short cycle time on the order of a few msec to several tens of msec, for example. In the flowchart of FIG. 12, only the control operation is different between SA20 and SB20 as compared to the flowchart of FIG. 9 and other steps SB10, SB30, SB40, and SB50 have the same control operations as SA10, SA30, SA40, and SA50, respectively, and will not be described. In FIG. 12, if the determination at SA10 is positive, it is determined whether the HV-ECU power-on is being continued, i.e., whether the limiting resistor overheat protection mode is activated at SB20 corresponding to the ECU power-on continuation determining means 110.

As described above, according to this embodiment, if the HV-ECU 24 is operated for improving the durability of equipments (the electric motor M, the limiting resistor R) making up the transmission 40 even during the vehicle power-off, i.e., the HV-ECU power-on is continued in the limiting resistor overheat protection mode, the switchover of the shift range of the transmission 40 is executed based on the sensor outputs (the detection signal voltages $V_{SF}$, $V_{SL}$) at the time of vehicle power-on. This causes the switchover to be properly executed to the shift range of the transmission 40 corresponding to the shift position $P_{SH}$ at the time of vehicle power-on since the memory of the determination result is retained as to whether the sensor output (detection signal voltages $V_{SF}$, $V_{SL}$) is normal or abnormal because the HV-ECU 24 is in operation.

Although the embodiments of the present invention have been described in detail with reference to the drawings, the present invention is applied in other aspects.

For example, although the electronic control portion 20 (e.g., the HV-ECU 24) temporarily stores in the RAM the determination result acquired when it is determined whether the detection signal voltages $V_{SF}$, $V_{SL}$ are normal or abnormal in the above embodiments, the determination result may be stored in a rewritable non-volatile memory, for example.

Although the control operation for switching the shift range is performed based on whether the memory of the determination result is retained as to whether the sensor outputs are normal or abnormal if the shift lever 32 is located at shift position $P_{SH}$ other than the initial position when the vehicle is powered on in the above embodiments, the present invention is applicable not only to the shift lever 32 but also to the P-switch 34.

Although the shift lever 32 is two-dimensionally shift-operated in the above embodiments, the shift lever 32 may be shift-operated along one axis or three-dimensionally shift-operated.

Although the shift sensor 36 and the select sensor 38 are included as position sensors detecting a position of the shift lever 32 in the above embodiments, the number of the position sensors is not limited to two.

Although the shift lever 32 of the above embodiments is a momentary-type lever switch shift-operated to a plurality of the shift positions $P_{SH}$, the shift lever 32 may instead be a push button switch or a slide switch, for example. Moreover, the shift operating device 30 may be shift-operated by a foot instead of manual operation or shift-operated in response to driver's voice. Although separated from the P-switch 34, the shift lever 32 may further include a parking position and may be configured to have a function of the P-switch 34. The present invention is applicable in such a way.

A plurality of the above embodiments may be implemented in combination with each other by setting the order of priority.

The above description is only embodiments and the present invention may be implemented in an aspect having various modifications and improvements made based on the knowledge of those skilled in the art.

EXPLANATIONS OF LETTERS OR NUMERALS

10: vehicle shift control apparatus
20: electronic control portion
30: shift operating device
32: shift lever (momentary-type operation element)
34: P-switch (momentary-type operation element)
40: transmission

The invention claimed is:

1. A vehicle shift control apparatus including a position sensor that detects an operational position of an operation element included in a shift operating device and operated artificially and an electronic control portion that electrically controls switchover of a shift range of a transmission based on a position signal corresponding to the operational position, output from the position sensor,
   the electronic control portion determining whether the position signal output from the position sensor is normal or abnormal and storing a determination result of whether the position signal is normal or abnormal,
   the electronic control portion switching the shift range based on the position signal output from the position sensor acquired when a vehicle electric power supply is turned on if the electronic control portion retains a memory of the determination result when the vehicle electric power supply is turned on, not switching the shift range based on the position signal output from the position sensor acquired when the vehicle electric power supply is turned on if the electronic control portion does not retain the memory of the determination result.

2. The vehicle shift control apparatus of claim 1, wherein if the electronic control portion does not retain the memory of the determination result, the electronic control portion switches the shift range based on a changed position signal, provided that the position signal is changed after the vehicle electric power supply is turned on.

3. The vehicle shift control apparatus of claim 1, wherein the electronic control portion retains the memory of the determination result regardless of a state of the vehicle electric power supply.

4. The vehicle shift control apparatus of claim 2, wherein the electronic control portion retains the memory of the determination result regardless of a state of the vehicle electric power supply.

5. The vehicle shift control apparatus of claim 1, wherein even while the vehicle electric power supply is turned off, if the electronic control portion maintains its operation to protect equipments making up the transmission, the electronic control portion switches the shift range based on the position signal acquired when the vehicle electric power supply is turned on.

6. The vehicle shift control apparatus of claim 2, wherein even while the vehicle electric power supply is turned off, if the electronic control portion maintains its operation to protect equipments making up the transmission, the electronic control portion switches the shift range based on the position signal acquired when the vehicle electric power supply is turned on.

7. The vehicle shift control apparatus of claim 3, wherein even while the vehicle electric power supply is turned off, if the electronic control portion maintains its operation to protect equipments making up the transmission, the electronic control portion switches the shift range based on the position signal acquired when the vehicle electric power supply is turned on.

8. The vehicle shift control apparatus of claim 4, wherein even while the vehicle electric power supply is turned off, if the electronic control portion maintains its operation to protect equipments making up the transmission, the electronic control portion switches the shift range based on the position signal acquired when the vehicle electric power supply is turned on.

9. The vehicle shift control apparatus of claim 1, wherein the electronic control portion retains the memory of the determination result until a predetermined time has elapsed after the vehicle electric power supply was turned off.

10. The vehicle shift control apparatus of claim 2, wherein the electronic control portion retains the memory of the determination result until a predetermined time has elapsed after the vehicle electric power supply was turned off.

11. The vehicle shift control apparatus of claim 3, wherein the electronic control portion retains the memory of the determination result until a predetermined time has elapsed after the vehicle electric power supply was turned off.

12. The vehicle shift control apparatus of claim 4, wherein the electronic control portion retains the memory of the determination result until a predetermined time has elapsed after the vehicle electric power supply was turned off.

13. The vehicle shift control apparatus of claim 5, wherein the electronic control portion retains the memory of the determination result until a predetermined time has elapsed after the vehicle electric power supply was turned off.

14. The vehicle shift control apparatus of claim 6, wherein the electronic control portion retains the memory of the determination result until a predetermined time has elapsed after the vehicle electric power supply was turned off.

15. The vehicle shift control apparatus of claim 7, wherein the electronic control portion retains the memory of the determination result until a predetermined time has elapsed after the vehicle electric power supply was turned off.

16. The vehicle shift control apparatus of claim 8, wherein the electronic control portion retains the memory of the determination result until a predetermined time has elapsed after the vehicle electric power supply was turned off.

17. The vehicle shift control apparatus of claim 1, wherein the shift operating device includes a momentary-type operation element returned to an initial position while an external force is not applied, and wherein
if the operation element is located in an operational position other than the initial position when the vehicle electric power supply is turned on, the electronic control portion switches the shift range based on whether the memory of the determination result is retained.

18. The vehicle shift control apparatus of claim 2, wherein the shift operating device includes a momentary-type operation element returned to an initial position while an external force is not applied, and wherein
if the operation element is located in an operational position other than the initial position when the vehicle electric power supply is turned on, the electronic control portion switches the shift range based on whether the memory of the determination result is retained.

19. The vehicle shift control apparatus of claim 3, wherein the shift operating device includes a momentary-type operation element returned to an initial position while an external force is not applied, and wherein
if the operation element is located in an operational position other than the initial position when the vehicle electric power supply is turned on, the electronic control portion switches the shift range based on whether the memory of the determination result is retained.

20. The vehicle shift control apparatus of claim 4, wherein the shift operating device includes a momentary-type operation element returned to an initial position while an external force is not applied, and wherein
if the operation element is located in an operational position other than the initial position when the vehicle electric power supply is turned on, the electronic control portion switches the shift range based on whether the memory of the determination result is retained.

* * * * *